United States Patent
Ng

(10) Patent No.: US 6,772,247 B2
(45) Date of Patent: Aug. 3, 2004

(54) CIRCUIT FOR MERGING AND ALIGNING PREPEND DATA AND PAYLOAD DATA

(75) Inventor: Raymond Ng, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 10/300,315

(22) Filed: Nov. 19, 2002

(65) Prior Publication Data

US 2004/0098520 A1 May 20, 2004

(51) Int. Cl.⁷ .............................................. G06F 13/12
(52) U.S. Cl. ............................. 710/66; 710/54; 710/74; 711/100; 709/246
(58) Field of Search ............................... 710/30, 36, 38, 710/39, 52, 54, 55, 62, 65, 66, 73, 74; 709/246; 712/205, 207; 711/150

(56) References Cited

U.S. PATENT DOCUMENTS

| | | | | |
|---|---|---|---|---|
| 4,580,214 A | * | 4/1986 | Kubo et al. | 710/100 |
| 5,594,927 A | * | 1/1997 | Lee et al. | 710/66 |
| 5,892,761 A | * | 4/1999 | Stracke, Jr. | 370/395.1 |
| 6,223,344 B1 | * | 4/2001 | Gerard et al. | 717/170 |
| 6,625,605 B1 | * | 9/2003 | Terakura et al. | 707/10 |

* cited by examiner

Primary Examiner—Rehana Perveen
Assistant Examiner—RiJue Mai
(74) Attorney, Agent, or Firm—Blakely, Sokoloff, Taylor & Zafman LLP

(57) ABSTRACT

A circuit that merges and aligns data that resides in a buffer entry is described. The data residing in the buffer entry is divided into a prepend portion and a payload portion. The prepend and the payload portions of the data are each defined, in part, by a length and an offset. Given the lengths and offsets, the circuit fetches the data from the buffer entry, merges the data, and aligns the data.

18 Claims, 4 Drawing Sheets

CIRCUIT FOR MERGING AND ALIGNING PREPEND DATA AND PAYLOAD DATA

FIELD OF THE INVENTION

The present invention pertains to the field of integrated circuit design. More particularly, the present invention relates to a circuit that merges and aligns data.

BACKGROUND OF THE INVENTION

An integrated circuit (IC) is a device consisting of a number of connected circuit elements, such as transistors and resistors, fabricated on a single chip of silicon crystal or other semiconductor material. An IC may be processed to have a specified electrical characteristic. In a computer system, IC's typically form components such as a processor, a memory, and an input/output (I/O).

Components of a computer system communicate information to each other through data packets. Data packets may comprise a prepend portion and a payload portion. The prepend portion is also often known as a header. The prepend portion provides information regarding the payload portion that allows for the functional blocks to process the payload portion.

The prepend portion and the payload portion may each have a variable length. In addition, the starting memory location of the prepend portion, as well as the payload portion, may vary with each transmission. The components of a computer system may not be compatible with one another if the components have different data formats. For example, a memory that stores and transmits data in eight byte blocks may not be compatible with an I/O that receives and processes data in four byte blocks. Moreover, the I/O device which receives and processes the data may expect the data packet to begin at byte zero and may not be able to deal with gaps between the prepend portion and the payload portion.

BRIEF DESCRIPTION OF THE DRAWINGS

The embodiments of the present invention are illustrated by way of example and not in the figures of the accompanying drawings, in which like references indicate similar elements and in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The memory of a computer system may be comprised of a plurality of memory cells with each memory cell storing a bit of data. Depending on the application of the system, the memory may be capable of storing 64, 128, 256, or more bytes of data. For one embodiment of the invention, the data has a prepend portion and a payload portion. The prepend portion and the payload portion may be separated in the memory. In other words, empty memory cells may exist between the memory cells that store the prepend portion and the memory cells that store the payload portion. The memory may be accessed in units or blocks of data that are fixed. For example, the memory may be accessed in only eight byte blocks.

Similarly, a component that communicates with the memory may only receive data in blocks of data that are fixed. A component, such as a processor, may accept data only in four byte blocks. Moreover, the component may also require that no separation exists between the prepend portion of the payload portion of the data. A circuit may be used to process the data in the memory such that data is transmitted from the memory in four byte blocks with no separation between the prepend and payload portions.

Figure 1:
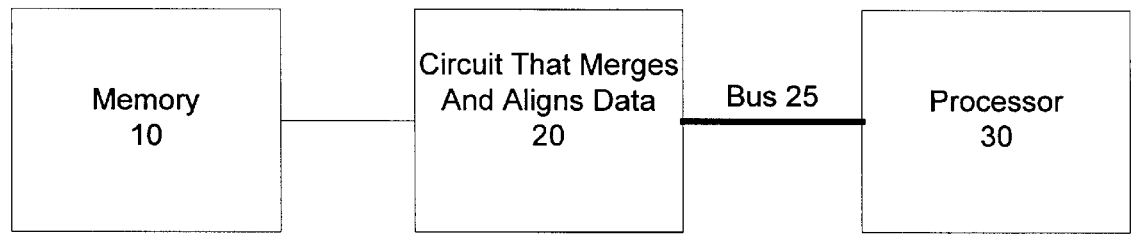
FIG. 1 is a system with a circuit that merges and aligns data.

FIG. 1 depicts a computer system having a memory 10 coupled to a circuit 20 that processes the data fetched from memory 10. The circuit 20 is coupled to a bus 25. The bus 25 is coupled to a processor 30. For this embodiment of the invention, memory 10 is comprised of a plurality of memory cells with each memory cell storing a bit of data. The circuit 20 processes the data fetched from memory 10. The circuit 20 merges the prepend and the payload portions. Moreover, the circuit 20 aligns the data to be transmitted to bus 25. The processor 30 may request data from the memory 10. The data may be transferred to processor 30 via bus 25.

Figure 2:
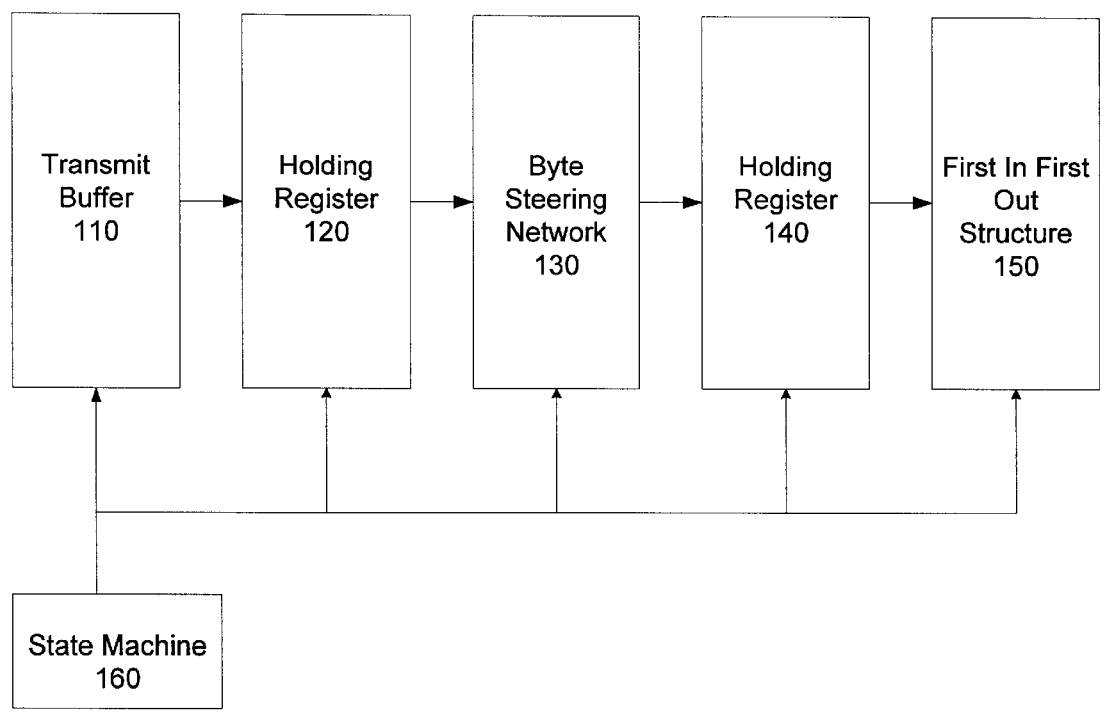
FIG. 2 is an embodiment of a circuit for merging and aligning data.

FIG. 2 depicts a circuit for merging and aligning data. Transmit buffer 110 stores the data that is to be transferred to another component. Transmit buffer 110 is coupled to a holding register 120. Holding register 120 is coupled to a state machine 160 that enables the holding register 120 to read data from the transmit buffer 110. Byte steering network 130 is coupled to the holding register 120 and the state machine 160. Byte steering network 130 realigns the data byte lanes between holding register 120 and holding register 140. The holding register 140 is coupled to a first in first out (FIFO) structure 150.

Figure 3:
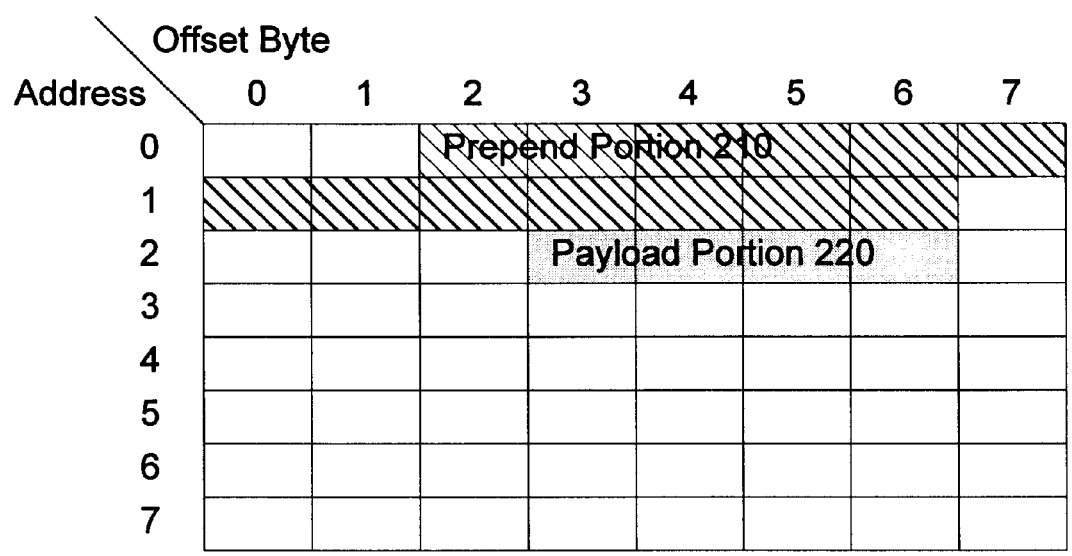
FIG. 3 is an embodiment of a transmit buffer entry.

For this embodiment of the invention, transmit buffer 110 is a static random access memory (SRAM) having approximately 8K bytes of storage space. The transmit buffer may be organized into 128 elements, each element being 64 bytes. The organization of a buffer element is shown in FIG. 3 and will be described in further detail below. Each storage block or buffer entry within an element is defined by an address and an offset. Thus, if an element is capable of storing 64 bytes of data, each buffer entry of the element may be uniquely identified using eight addresses and eight offsets. For this case, each location defined by an address and an offset represents one byte of data.

The transmit buffer 110 may be accessed in 64 bits or eight byte blocks. The prepend portion may have a starting offset of zero to seven bytes and a length ranging from zero to 31 bytes. The payload portion may have a starting offset of zero to seven bytes and a length ranging from one, to 256 bytes. Thus, while the data may not have a prepend portion, data must have a payload portion to be valid.

The state machine 160 receives as inputs the prepend offset, the prepend length, the payload offset, and the payload length. From this information, the state machine 160 provides a control signal to the holding register 120 to fetch data from the specified transmit buffer 110 locations. The holding register 120 may hold up to eight bytes of data, while the holding register 140 may hold up to four bytes of data in this embodiment of the invention.

To process the prepend portion, the first eight bytes of data are transferred from the transmit buffer 110 into the holding register 120. The holding register 120 is used as a temporary storing unit. The byte steering network 130 realigns the data, if necessary, to remove the starting prepend offset. The data is then transferred into the holding register 140. After the prepend processing has completed, the payload processing begins. Any remaining trailing bytes from the prepend portion in holding register 140 are merged with the leading bytes of the payload to form four bytes of data. In other words, the payload portion is stored in an adjacent buffer entry from where the last byte of the prepend portion was written.

FIG. 3 depicts an embodiment of a buffer element storing a prepend portion 210 and a payload portion 220 of data. The buffer element comprises eight addresses and eight offsets and has a total storage capacity of 64 bytes. The prepend portion 210 of the data begins at address 0, byte 2 and ends at address 1, byte 6. Thus, the prepend portion 210 has an offset of two and a length of 13 bytes. In contrast, the payload portion 220 begins at address 1, byte 3 and ends at address 1, byte 6. The payload portion 220 has an offset of 3 and a length of four bytes.

Because the holding register 120 only stores eight bytes for this embodiment of the invention, three reads from transmit buffer 110 need to be performed to process the entire data packet. The first read begins at address 0, offset 0. As a result, the eight bytes of address 0 of transmit buffer 110 are transferred to holding register 120. The byte steering network 130 moves bytes 2–5 of address 0 from holding register 120 into holding register 140 because bytes 2–5 are the first valid four bytes of data. For this embodiment of the invention, holding register 140 only comprises four bytes of storage capacity. Bytes 2–5, which are stored in holding register 140, are then written or enqueued to FIFO 150. Once the storage space of holding register 140 is freed, bytes 6–7 of address 0 are moved from holding register 120 to holding register 140.

The eight bytes of data in address 1 may now be read from transmit buffer 110 and stored into holding register 120. The byte steering network 130 moves bytes 0–1 of address 1 from holding register 120 to the remaining two free bytes of holding register 140 (the other two bytes are still holding bytes 6–7 of address 0). Because the holding register 140 is full, the contents are enqueued to FIFO 150. Since the storage space of holding register 140 is now available again, bytes 2–5 of address 1 stored in holding register 120 may be moved to holding register 140. The data is then enqueued from holding register 140 to FIFO 150. Once the storage space of holding register 140 is freed, byte 6 of address 1 is moved from holding register 120 to holding register 140.

Finally, the eight bytes of data may be read from address 2 of transmit buffer 110 and stored into holding register 120. The byte steering network 130 moves bytes 3–5 of address 2 from holding register 120 to the three free bytes of holding register 140. The contents of holding register 140 are then enqueued to FIFO 150. With holding register 140 having free storage space again, byte 6 of address 2 stored in holding register 120 may be moved to holding register 140. This last remaining valid byte of data stored in holding register 140 may be enqueued to FIFO 150 to complete the transfer of data.

After all the valid data of the buffer element has been processed, the system is ready to process the next buffer element. Note that a buffer element may have a prepend portion having a different offset and length from the other buffer elements. In addition, each buffer element may have a payload portion having different offsets and lengths. The circuit described in FIG. 2 is compatible with buffer elements having data portions that have different offsets and lengths.

To enable the transmission of four byte blocks to another component despite the transmit buffer 110 being accessed in eight byte blocks by the holding register 120, the data must be properly aligned. The byte steering network 130 accesses only four bytes of data at a time. The state machine 160 instructs the byte steering network 130 which of the four bytes of data held in the holding register 120 to access. In addition, the state machine 160 instructs the byte steering network 130 in what order to place the fetched data into the holding register 140. Each byte of storage space of the holding register 140 may have a write enable to allow partial writes of less than four bytes.

For another embodiment of the invention, the function of state machine 160 may be performed by a plurality of finite state machines to keep the design of the state machine a manageable size and to simplify coding and debug. For example, a first state machine may be responsible for handling the prepend processing. Similarly, a second, a third, a fourth, and a fifth state machine may be responsible for handling the payload processing. The prepend and payload state machines may be responsible for generating a read enable signal for the transmit buffer 110, enabling the loading of the holding register 120, controlling the byte steering network 130, generating the appropriate load enables for the holding register 140, generating the control signal for the FIFO 150 when there is enough data in the holding register 140 to queue the FIFO 150, and generating a done signal when the merge and align operation is completed.

The prepend state machine first examines the prepend length. If the prepend length is zero, there is no prepend portion and the prepend processing step is skipped. If the prepend length is not zero, the prepend is loaded into the holding register 120. The prepend state machine uses the prepend offset to determine where the initial valid data begins. A counter tracks the prepend portion as it is written to the holding register 120. The counter helps to determine when the entire prepend portion has been read from the transmit buffer 110. The prepend, if present in the buffer entry, may have an offset of zero to seven bytes and a length ranging from zero to 31 bytes.

The payload portion is processed after the last prepend is written to the holding register 120. In order for the prepend and payload portions to be properly merged, it is important to know where the last byte of the prepend was written because the payload starts at the next byte. Thus, once the prepend processing is completed, processing is handed over to one of the four payload state machines. Each payload state machine handles a different starting alignment in the holding register 140. Only one of the plurality of payload state machines, however, is active at any given time.

The payload state machine needs to know the payload offset and payload length. Processing of the payload portion may be similar to processing of the prepend portion. A counter tracks the payload portion as it is written to the holding register 120. Processing of the payload portion is complete when the counter reaches zero. However, while prepend processing always has a starting alignment of zero in the holding register 140, the payload processing may have starting alignments of zero, one, two, or three depending on the length of the prepend portion. There is a separate payload state machine for each starting alignment.

For this embodiment of the invention, the bus coupled to the FIFO 150 is four bytes wide. Only one of the payload state machines is activated after the prepend state machine has finished processing the prepend portion. The first payload state machine is activated if the prepend length divided by four leaves a remainder of zero. For this case, the payload portion begins at offset 0 of holding register 140. The second payload state machine is activated if the prepend length divided by four leaves a remainder of one; the payload portion begins at offset 1 of holding register 140. The third payload state machine is activated if the prepend length divided by four leaves a remainder of two; the payload portion begins at offset 2 of holding register 140. The fourth payload state machine is activated if the prepend length divided by four leaves a remainder of three; the payload begins at offset 3 of holding register 140.

The starting alignment is limited to four options because the data is being merged and aligned to be output on a four byte wide bus. The starting alignments correspond to one of the four bytes of the bus. The invention, however, is not limited to only four starting alignment options. When the payload state machine finishes processing the payload data, control is passed back to the prepend state machine which then begins processing the next buffer entry.

Figure 4:
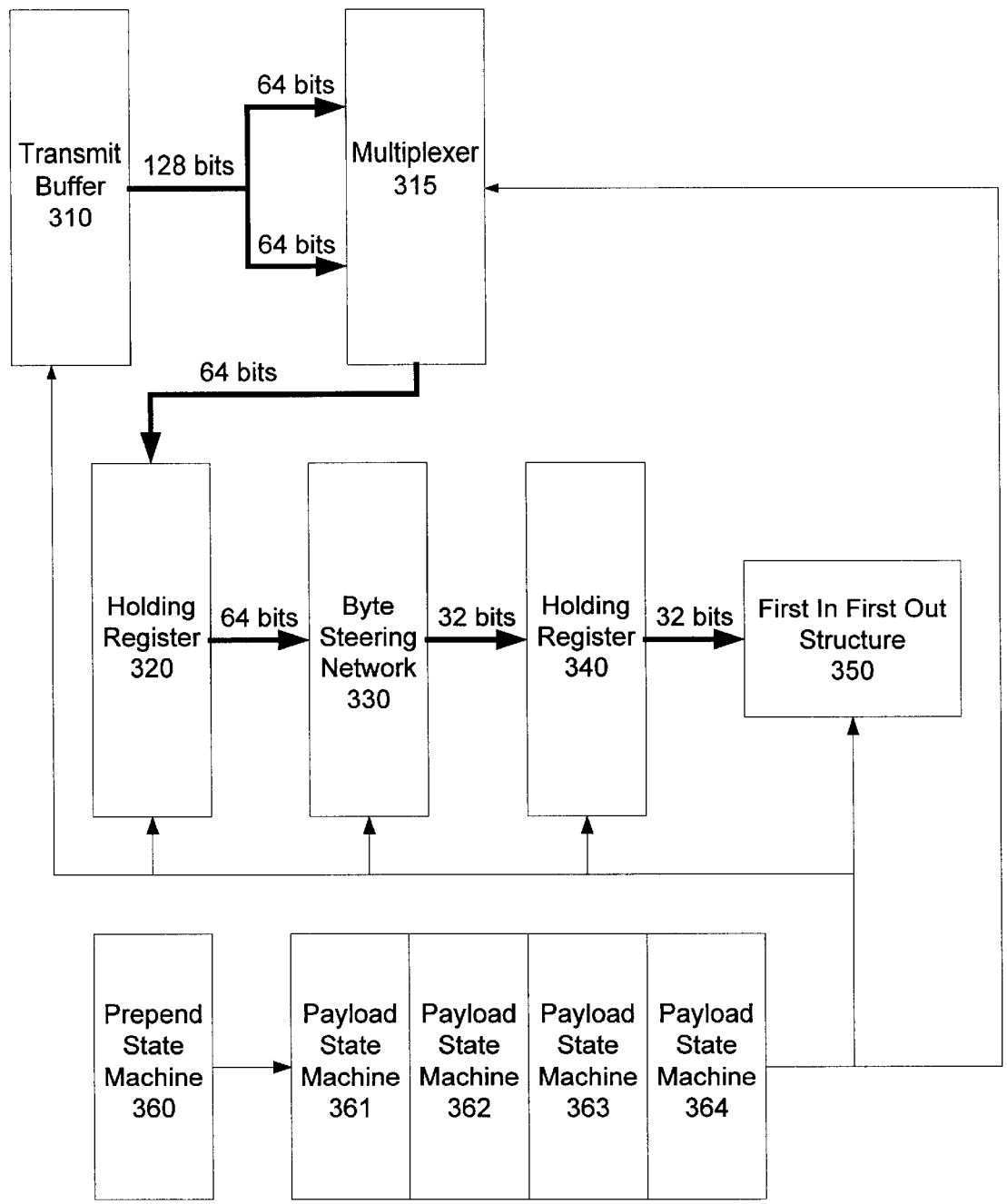
FIG. 4 is another embodiment of a circuit for merging and aligning data.

For yet another embodiment of the invention, transmit buffer may be accessed 128 bits at a time. FIG. 4 depicts a circuit for merging and aligning data that is accessed 128 bits at a time from transmit buffer 310. A multiplexer 315 is coupled to the transmit buffer 310. The holding register 320 is coupled to the output of multiplexer 315. A byte steering network 330 is coupled to the holding register 320. A holding register 340 is coupled to the output of the byte steering network 330. A FIFO 350 is coupled to the output of the holding register 340. A state machine comprising prepend state machine 360 and payload state machines 361–364 are coupled to transmit buffer 310, multiplexer 315, holding register 320, byte steering network 330, holding register 340, and FIFO 350.

For this embodiment of the invention, transmit buffer 310 is a static random access memory (SRAM) having approximately 8K bytes of storage space. The transmit buffer 310 may have 32 elements. Each element may be capable of storing 256 bytes worth of data. The transmit buffer 310 is accessed in 128 bit or 16 byte blocks. The prepend portion may have a starting offset of zero to seven bytes and a length ranging from zero to 31 bytes. The payload portion may begin on the next eight byte unit following the prepend portion. The payload portion may have a starting offset of zero to seven bytes and a length ranging from one to 256 bytes. Thus, while the data may not have a prepend portion, data must have a payload portion to be valid.

Even though the transmit buffer 310 is configured to be accessed in 128 bit blocks, the data may still be processed 64 bits at a time. A multiplexer 315 coupled to transmit buffer 310 is used to multiplex the upper or lower 64 bits of the 128 bit buffer output into the holding register 320. The output of the holding register 320 is coupled to a byte steering network 330 that merges the prepend and payload portions and aligns the data to be output on a 32 bit bus. Data is held in holding registers 320 and 340 as long as needed to perform the merging and alignment operations. The output of the byte steering network 330 is coupled to holding register 340. The payload state machines 361–364 control the order in which data is placed in the FIFO 350 from the holding register 340. The contents of the holding register 340 are written to the FIFO 350 whenever four bytes of data are available. The FIFO 350 then transmits the merged data having 32 bits and an offset of zero to a bus.

In the foregoing specification the invention has been described with reference to specific exemplary embodiments thereof. It will, however, be evident that various modifications and changes may be made thereto without departure from the broader spirit and scope of the invention as set forth in the appended claims. The specification and drawings are, accordingly, to be regarded in an illustrative rather than restrictive sense.

What is claimed is:

1. A system, comprising:
   a memory, wherein the memory stores data having a prepend portion and a payload portion, wherein the data may be accessed from memory in k byte units, wherein k is an integer greater than or equal to one;
   a bus coupled to the memory, wherein the bus transfers data from the memory, wherein the bus is m bytes wide, wherein m an is an integer greater than or equal to one; and
   a circuit coupled to the memory and the bus, wherein the circuit fetches the data from the memory, merges the prepend and payload portions, and aligns the data to output to the m byte bus.

2. The system of claim 1, further comprising:
   a processor coupled to the bus, wherein the processor receives the data from the bus.

3. The system of claim 1, wherein the circuit comprises a state machine that determines the order that data is transferred to the bus.

4. The system of claim 3, further comprising:
   a first holding register coupled to the state machine, wherein the first holding register stores the data fetched from the memory.

5. The system of claim 4, further comprising:
   a second holding register coupled to the circuit, wherein the second holding register stores the data after the circuit aligns the data to be transmitted m bytes at a time on the bus.

6. The system of claim 5, further comprising a first in first out (FIFO) structure coupled to the second holding register, wherein data is transferred from the second holding register to the FIFO when m bytes of data are available in the second holding register.

7. A system, comprising:
   a first memory that stores data having a header portion and a payload portion, wherein the header and payload portions are each defined by a length and an offset, wherein the memory has a 128 bit output;
   a multiplexer coupled to the memory, wherein the multiplexer selects 64 bits of the 128 bit memory output;
   a second memory coupled to the multiplexer that stores the output of the data selected by the multiplexer; and
   a circuit coupled to the second memory, wherein the circuit merges and aligns the header and the payload portions to enable transfer on a 32 bit bus.

8. The system of claim 7, further comprising:
   a first state machine coupled to the first memory, wherein the first state machine determines where the data begins in the first memory.

9. The system of claim 7, wherein the first memory is a static random access memory.

10. The system of claim 8, further comprising:
    a second state machine coupled to the first state machine, wherein the second state machine is activated if the header length divided by four leaves a remainder of zero;

a third state machine coupled to the first state machine, wherein the third state machine is activated if the header length divided by four leaves a remainder of one;

a fourth state machine coupled to the first state machine, wherein the fourth state machine is activated if the header length divided by four leaves a remainder of two; and a fifth state machine coupled to the first state machine, wherein the fifth state machine is activated if the header length divided by four leaves a remainder of three.

11. The system of claim 10, further comprising:

a third memory coupled to the circuit, wherein the third memory stores the data aligned by the circuit.

12. The system of claim 11, wherein the third memory has a storage capacity of 32 bits.

13. A method, comprising:

fetching data having a prepend section and a payload section from a memory;

writing the prepend section to a storage area;

writing the payload section to the next available byte of the storage area;

transferring the data to a first in first out (FIFO) structure when m bytes of data are stored in the storage area transmitting the data in the FIFO to a m byte bus; and aligning the data to be transmitted to the bus relative to the fetched data from the memory.

14. The method of claim 13, further comprising:

using a counter to track the data being written to the storage area.

15. The method of claim 13, further comprising:

using a state machine to track an address of the storage area, wherein the state machine determines where data is to be written in the storage area.

16. A circuit, comprising:

m inputs that comprise a first portion and a second portion of data, wherein m is an integer greater than one;

a storage device coupled to the m inputs to store the data, wherein the first portion is stored in the storage device with a zero offset;

a state machine that tracks the last address byte written in the storage device, wherein the second portion is stored at the next byte address; and n outputs coupled to the storage device.

17. The circuit of claim 16, wherein the state machine selects n of m inputs to store in the storage device.

18. The circuit of claim 16, further comprising:

a first in first out (FIFO) structure coupled to the storage device, wherein the data is written to the FIFO when the storage device has n bits of data stored.

* * * * *

UNITED STATES PATENT AND TRADEMARK OFFICE
CERTIFICATE OF CORRECTION

PATENT NO. : 6,772,247 B2 Page 1 of 1
DATED : August 3, 2004
INVENTOR(S) : Ng

It is certified that error appears in the above-identified patent and that said Letters Patent is hereby corrected as shown below:

<u>Column 3,</u>
Line 1, delete "6f", and insert -- of --.

Signed and Sealed this

Nineteenth Day of October, 2004

JON W. DUDAS
*Director of the United States Patent and Trademark Office*